Jan. 14, 1947.    M. J. O. STRUTT ET AL    2,414,279
ULTRA-SHORT WAVE DETECTOR
Filed March 24, 1943
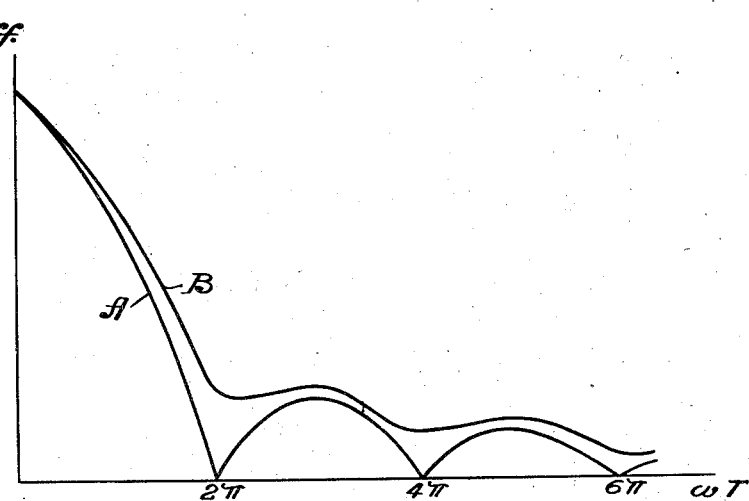
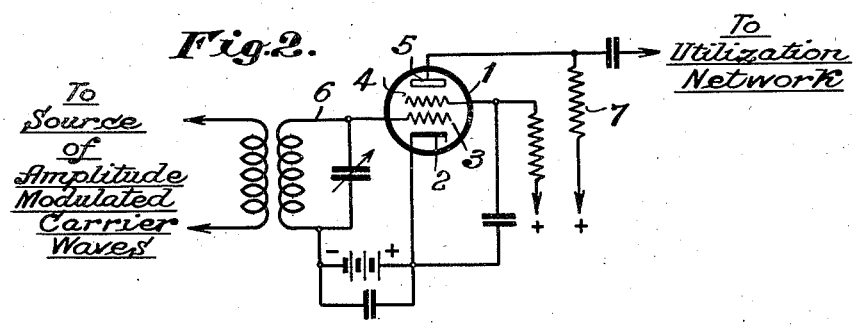
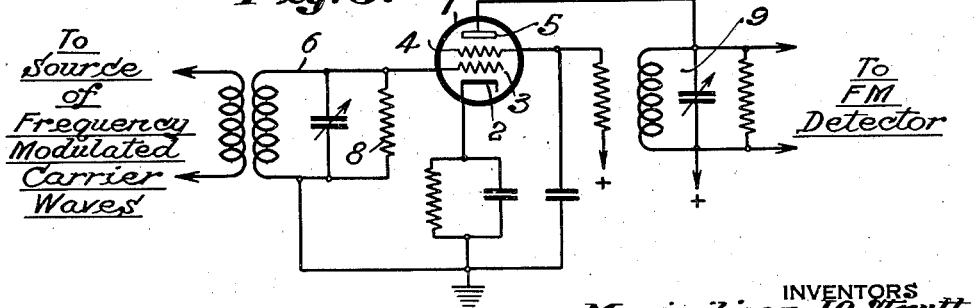
INVENTORS
Maximiliaan J.O. Strutt,
Aldert van der Ziel
BY H.S. Grover
ATTORNEY Patented Jan. 14, 1947

2,414,279

UNITED STATES PATENT OFFICE 2,414,279

ULTRASHORT WAVE DETECTOR

Maximiliaan Julius Otto Strutt and Aldert Van Der Ziel, Eindhoven, Netherlands, assignors to Hartford National Bank and Trust Company, Hartford, Conn., as trustee Application March 24, 1943, Serial No. 480,361
In the Netherlands January 15, 1941

4 Claims. (Cl. 250—27)

This invention relates to circuits for amplitude, or frequency, detection of ultra-short waves; the term "amplitude detection" being understood to mean the rectification of an amplitude-modulated signal, whereas the term "frequency detection" is to be understood to mean the conversion of a frequency, or phase, modulated signal into an amplitude-modulated signal.

The invention relates more particularly to a detector circuit comprising a discharge tube which contains at least a cathode, an input electrode, an output electrode and an auxiliary electrode arranged in front of the output electrode; the oscillations to be detected being fed to the input electrode, and the detected oscillations being derived from the output electrode.

According to the invention, the direct current voltages and the relative spacing of the auxiliary electrode and the output electrode are such that the transit time of the electrons from the auxiliary electrode to the output electrode is at least of the same order of magnitude as the periodic time of the carrier wave of the oscillations to be detected.

The invention is based on recognition of the fact that in the case of ultra-high frequencies the effective mutual conductance of a discharge tube is governed by the transit time of the electrons from the electrode preceding the output electrode to the output electrode.

In the drawing:

Fig. 1 graphically shows the relation between mutual conductance and the product of frequency and electron transit time of an electron discharge tube for two separate voltage relations, Fig. 2 shows an embodiment of the invention applied to detection of amplitude modulated waves, Fig. 3 shows a modification wherein frequency modulated waves are detected.

Fig. 1 is a graph of the effective mutual conductance $S_{eff}$ of a discharge tube illustrated as a function of the product $\omega T$, $\omega$ designating the angular frequency of a signal fed to the input electrode, and T designating the transit time of the electrons from the positive screen electrode preceding the output electrode to the positive output electrode 5. The curve A indicates the results obtained if the electrode 4 preceding the output electrode 5 has the same potential as the output electrode, whereas the curve B indicates the results obtained if one of the two said electrodes has zero potential. The effective mutual conductance occurring in practice will always be contained in the range enclosed by the curves A and B. The figure shows that the effective mutual conductance for those frequencies for which the said transit time is at least of the same order of magnitude as the periodic time of the oscillations under consideration is substantially smaller than the static mutual conductance, and that the effective mutual conductance is a minimum when the said transit time is substantially equal to the periodic time of the oscillation under consideration or to a whole multiple thereof.

The use of the circuit according to the invention for amplitude-detection thus insures the advantage that the output circuit has passing through it a very small current having only the frequency of the oscillations to be detected so that oscillations of this frequency can be separated quite readily from the detected oscillations. An optimum result is obtained in amplitude-detection if the said transit time T is at least approximately equal to the periodic time of the oscillations to be detected. Fig. 1 also shows that the effective mutual conductance varies greatly with frequency. If a frequency, or phase, modulated signal is fed to the input electrode the result will be that a high frequency signal of variable amplitude occurs in the output circuit, which means that the circuit according to the invention can be used without additional devices for converting a frequency, or phase, modulated signal into an amplitude-modulated signal, an optimum result being obtained if the said transit time T is about ⅔ of the periodic time of the unmodulated carrier wave.

Fig. 2 shows a circuit for amplitude-detection in which use is made of a discharge tube 1 which comprises a cathode 2, an input electrode (control grid) 3, an auxiliary electrode (screen grid) 4 and an output electrode (anode) 5. The oscillations to be detected are fed to an oscillatory circuit 6 which is connected between the control grid 3 and the cathode 2. The control grid 3 is given such a negative bias that anode detection is obtained. The anode circuit includes a resistance 7 across which the detected oscillations occur. According to the invention, the relative spacing and the positive bias voltages of the screen grid 4 and the anode 5 are such that the transit time of the electrons from the screen grid to the anode is at least approximately equal to the periodic time of the oscillations to be detected. In this case, the anode circuit will have a minimum high frequency current passing through.

Instead of anode-detection being employed in the circuit shown in Fig. 2 grid detection may be adopted, and for this purpose a grid condenser and leak have to be included in well known manner in the control grid circuit.

Fig. 3 shows a circuit for frequency detection which substantially corresponds to the circuit shown in Fig. 2. The oscillatory circuit 6 to which the frequency, or phase, modulated signal to be detected is fed is damped by a resistance 8 so as to secure the desired wide pass-range. The bias of the control grid 3 is such that rectification does not occur. In addition, the positive direct current voltages and the relative spacing of the screen grid 4 and the anode 5 are such that the transit time of the electrons from the screen grid to the anode is about ⅔ of the periodic time of the unmodulated carrier wave of the signal to be detected. The anode circuit includes an oscillatory circuit 9 which is likewise damped by a resistance, and across which the desired amplitude-modulated signal occurs. The low frequency signal to be received may be derived from this signal by means of any form of amplitude-detector.

In the circuits shown in Figs. 2 and 3 the screen grid 4 and the anode 5 are preferably given the same positive direct current voltage so that the effective mutual conductance approximates as far as possible to the curve A of Fig. 1.

What is claimed is:

1. In a circuit of the type for detection of ultra-short waves comprising a discharge tube which at least contains a cathode, an input electrode, an output electrode and an auxiliary electrode arranged in front of the output electrode, said input electrode being located in the electron stream between said cathode and auxiliary electrode, a source of the oscillations to be detected being connected to feed to the input electrode, and an output circuit being connected to the output electrode; the improvement which comprises means for applying positive direct current voltages to each of the auxiliary and output electrodes, and the relative spacing of the auxiliary electrode and the output electrode being such that the transit time of the electrons from the auxiliary electrode to the output electrode is at least of the same order of magnitude as the periodic time of the carrier wave of the oscillations to be detected.

2. A circuit for frequency-detection as claimed in claim 1, wherein the applied positive voltages and the relative spacing of the auxiliary electrode and the output electrode are such that the transit time of the electrons from the auxiliary electrode to the output electrode is at least approximately equal to ⅔ of the periodic time of the carrier wave of the oscillations to be detected.

3. In a detection circuit for modulated carrier wave energy of the type comprising an input circuit tuned to an ultra-high frequency, a tube provided with a cathode, a control grid, a positive screen grid and a positive plate, an output circuit coupled to said plate and cathode, said input circuit being coupled to said control grid and cathode; the improvement which consists in said screen grid and plate being relatively spaced to cause the transit time of the electrons passing from the screen grid to said plate to be at least of the same order of magnitude as the periodic time of said modulated carrier waves.

4. A circuit for deriving amplitude variable waves from angle modulated waves of the same ultra-high frequency, comprising a source of said angle modulated waves, an electron discharge tube having at least a cathode, control grid, screen grid and plate, said source being connected between said grid and cathode, means applying positive energizing voltages to the screen grid and plate, an output circuit, tuned to said frequency, coupled to said plate and cathode, and said screen grid and plate being relatively spaced to cause the transit time of electrons passing from screen grid to plate to be two-thirds the period time of said ultra-high frequency wave.

MAXIMILIAAN JULIUS OTTO STRUTT.
ALDERT VAN DER ZIEL.